United States Patent [19]
Stuth

[11] Patent Number: 5,609,754
[45] Date of Patent: Mar. 11, 1997

[54] SECONDARY SEWAGE TREATMENT SYSTEM

[76] Inventor: William L. Stuth, P.O. Box 950, Maple Valley, Wash. 98038

[21] Appl. No.: 526,117

[22] Filed: Sep. 7, 1995

[51] Int. Cl.$^6$ .................. C02F 3/04; C02F 3/06
[52] U.S. Cl. ............. 210/151; 210/195.1; 210/256; 210/261; 210/532.2
[58] Field of Search ............... 210/150, 151, 210/195.1, 194, 256, 261, 262, 617, 629, 532.2

[56] References Cited

U.S. PATENT DOCUMENTS

| Re. 26,716 | 11/1969 | Cirrincione | 99/312 |
|---|---|---|---|
| Re. 27,721 | 8/1973 | Klock | 210/14 |
| 877,569 | 1/1908 | Joseph . | |
| 2,388,795 | 11/1945 | Montgomery et al. | 210/151 |
| 2,553,228 | 5/1951 | Yonner | 210/5 |
| 2,822,329 | 2/1958 | Griffith | 210/629 |
| 3,238,124 | 3/1966 | Burton | 210/151 |
| 3,412,864 | 11/1968 | Okada | 210/151 |
| 3,494,463 | 2/1970 | Vermette | 210/151 |
| 3,841,999 | 10/1974 | Bennett et al. | 210/17 |
| 3,879,292 | 4/1975 | McClive | 210/282 |
| 3,966,599 | 6/1976 | Burkhead | 210/14 |
| 3,966,608 | 6/1976 | Mason et al. | 210/151 |
| 4,011,162 | 3/1977 | Oldham et al. | 210/194 |
| 4,039,437 | 8/1977 | Smith et al. | 210/9 |
| 4,043,912 | 8/1977 | Bascope et al. | 210/83 |
| 4,231,863 | 11/1980 | Sutphin | 210/615 |
| 4,336,135 | 6/1982 | Price | 210/151 |
| 4,391,703 | 7/1983 | Crosby | 210/151 |
| 4,420,397 | 12/1983 | Kaneko et al. | 210/611 |
| 4,599,174 | 7/1986 | McDowell | 210/614 |
| 4,617,917 | 12/1986 | Morper | 210/617 |
| 4,810,377 | 3/1989 | Kato et al. | 210/150 |
| 4,895,645 | 1/1990 | Zorich, Jr. | 210/150 |
| 4,933,076 | 6/1990 | Oshima et al. | 210/151 |
| 4,995,980 | 2/1991 | Jaubert | 210/602 |
| 5,030,353 | 7/1991 | Stuth | 210/615 |
| 5,049,266 | 9/1991 | Götz et al. | 210/151 |
| 5,156,742 | 10/1992 | Struewing | 210/195.1 |

FOREIGN PATENT DOCUMENTS

| 84-015714 | 5/1978 | Japan . |
|---|---|---|
| 57-122997 | 2/1981 | Japan . |
| 59-019584 | 7/1982 | Japan . |
| 62-279888 | 5/1986 | Japan . |
| 61-271090 | 5/1988 | Japan . |

Primary Examiner—Christopher Upton
Attorney, Agent, or Firm—Harry M. Cross, Jr.

[57] ABSTRACT

A secondary sewage treatment system is provided with a treatment vessel disposed within a septic tank. The treatment vessel has a draft tube for aerating and circulating waste liquor through the treatment vessel and through media contained within the treatment vessel. The media has one part that is submerged media and another part that is an unsubmerged trickle media. The operation of the draft tube circulated waste liquor within the treatment vessel through the submerged media and up through the draft tube where it is expelled and trickles down through the trickle media back into the liquor in the lower portion of the treatment vessel.

22 Claims, 3 Drawing Sheets

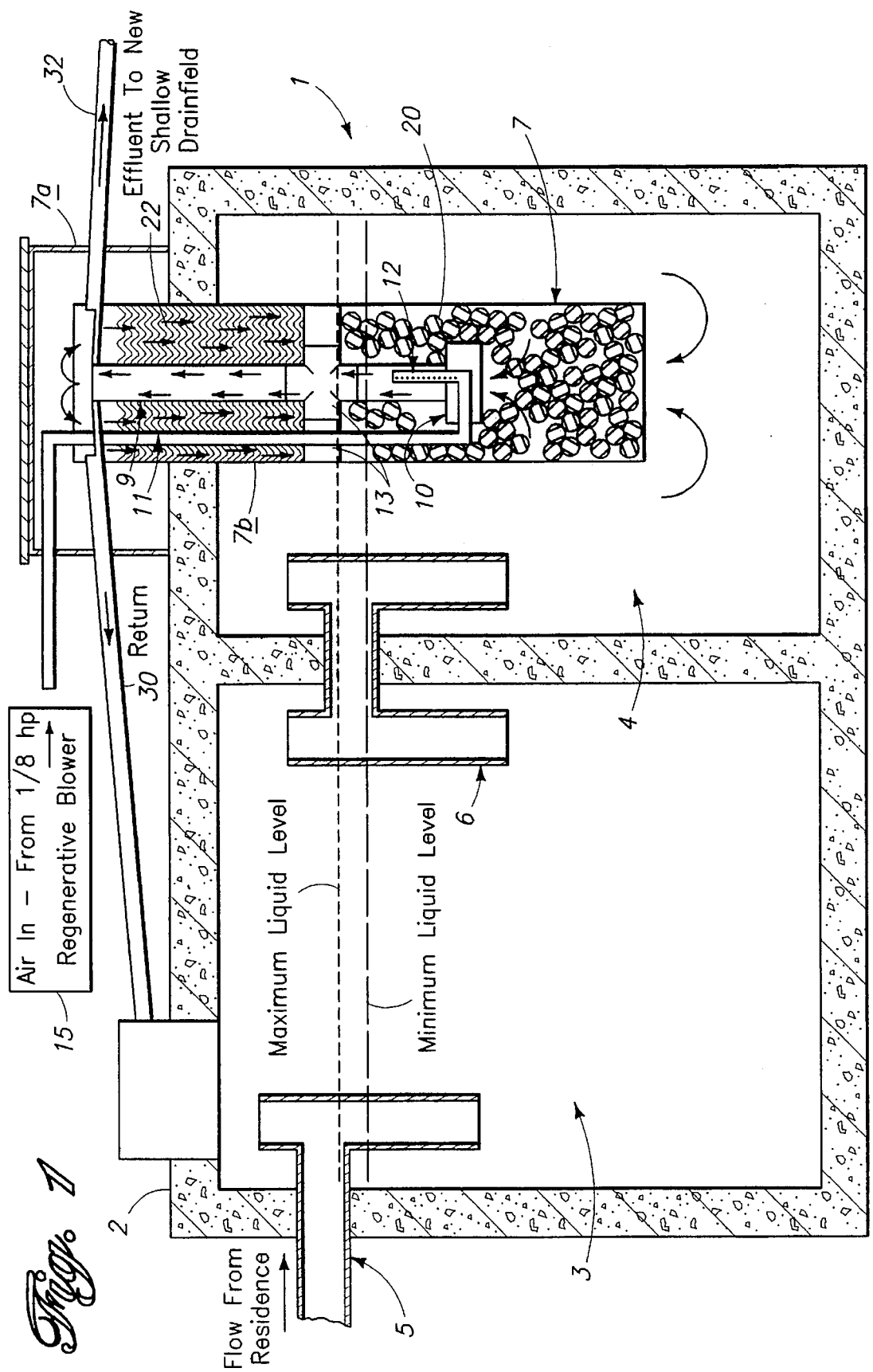

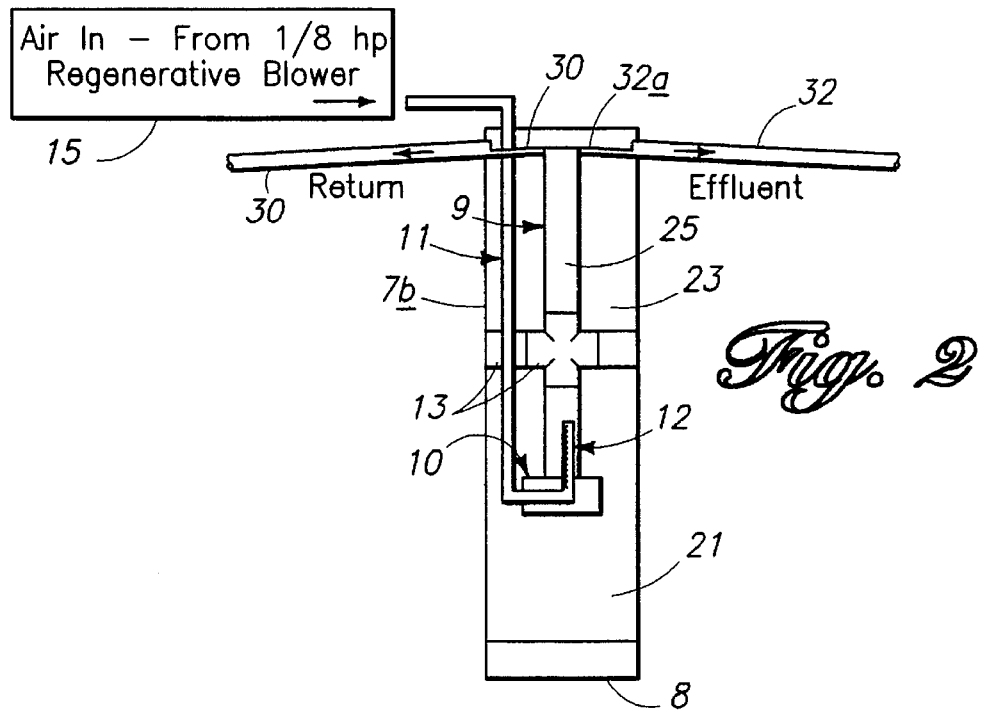
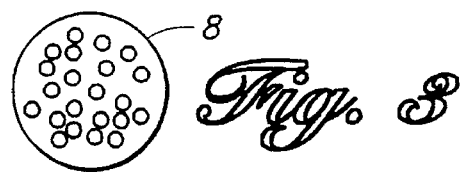
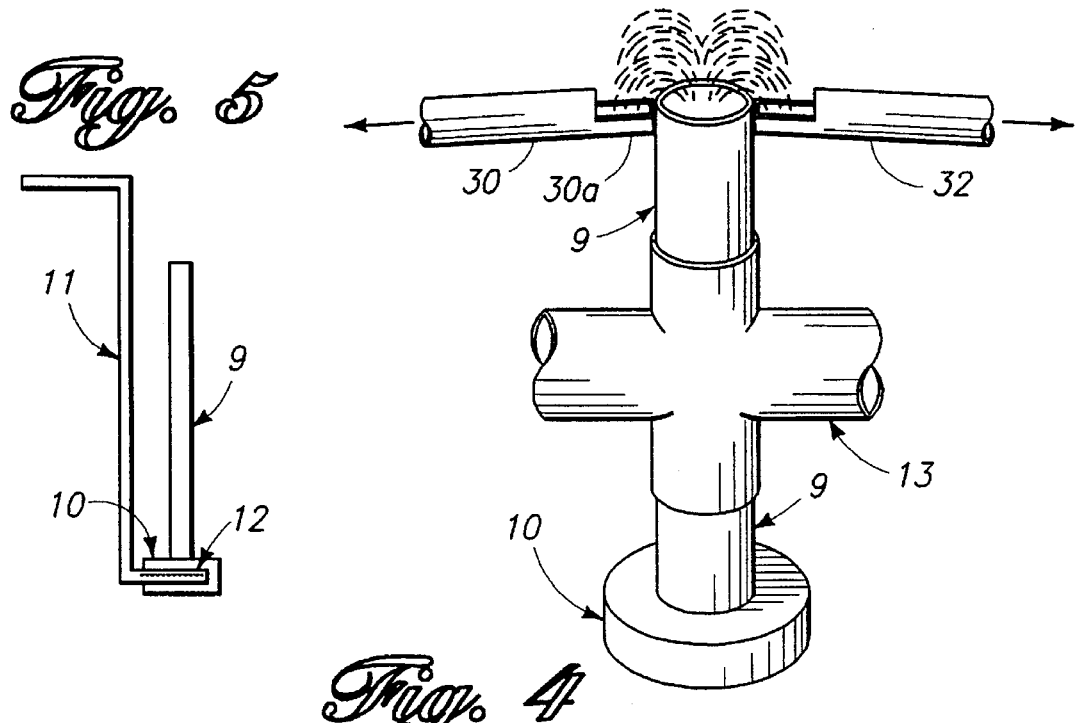

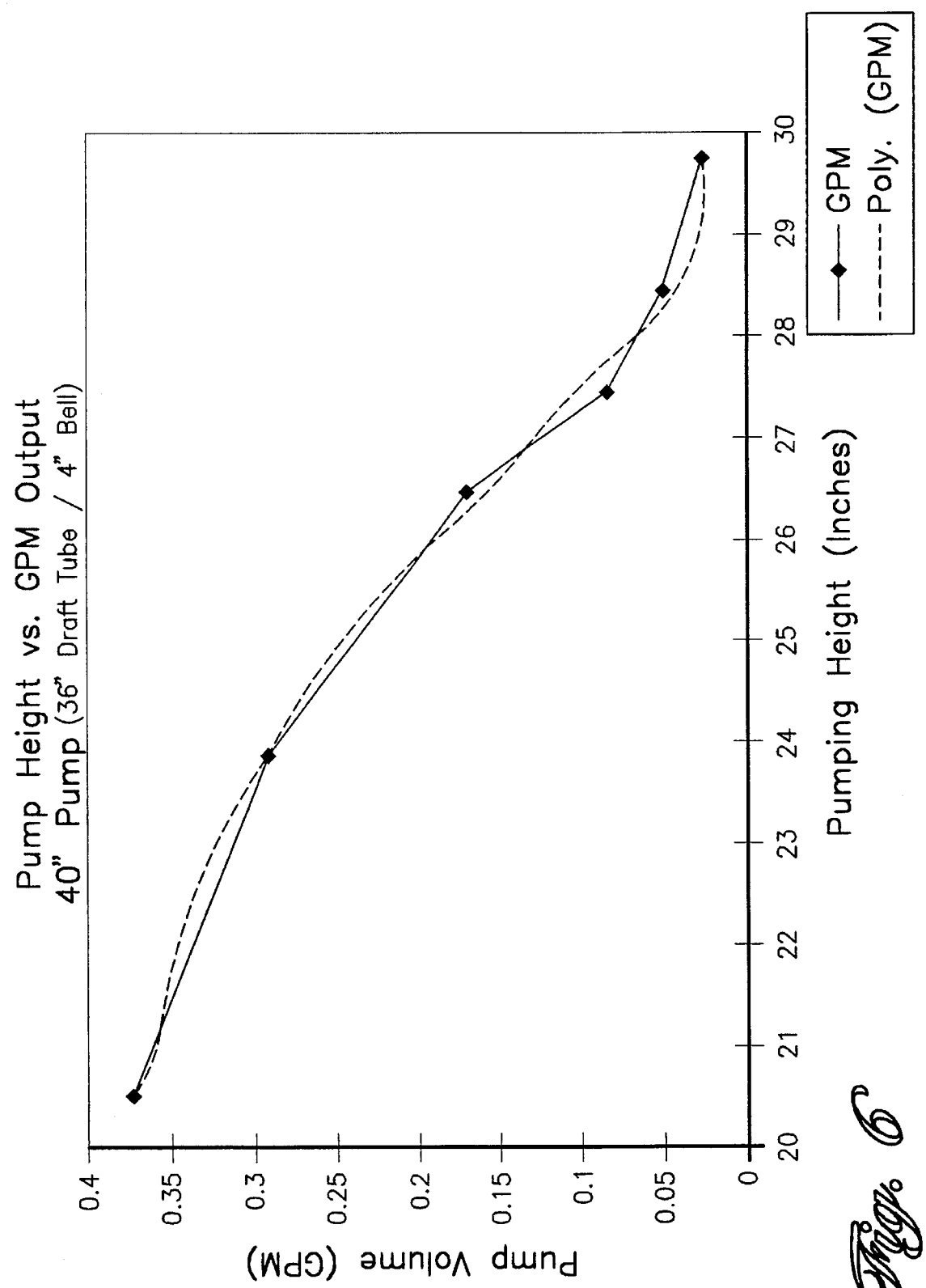

SECONDARY SEWAGE TREATMENT SYSTEM

FIELD OF THE INVENTION

This invention relates to on-site waste water treatment systems, and more particularly to secondary treatment systems for use in conjunction with residential septic systems.

BACKGROUND OF THE INVENTION

On-site disposal of waste water (sewage) from single family residences in areas with no conventional sewer system has conventionally been accomplished by a septic tank system. The anaerobic effluent discharged from the septic tank, after settling of the solids portion of the incoming waste water, is passed into a subsurface drain field for percolation into the surrounding soil. Such a system works satisfactorily if properly installed and if proper soil conditions for disposal of the effluent by the drain field exist. While most residential septic systems work with harmony between the septic tank and drain field, there are increasing numbers of drain field failures.

In a septic system waste material is treated by an anaerobic bacterial process which slowly decomposes the sewage into hydrogen sulfide gas, methane and water. Aside from the fact that such systems are relatively slow working, the gases resulting from the decomposition process have noxious odors and the methane gas is highly inflammable. Additionally, the slow decomposition process associated with septic systems will generally cause solids to accumulate in the system at a fairly high rate, since they are decomposed at a slower rate than they are deposited in the system. This results in the necessity of relatively frequent cleaning of the system. It will also be found that in some instances soil characteristics are such that the usual septic system cannot be used satisfactorily.

In such systems, heretofore, small treatment plants which make use of chemical and/or biological treatment schemes to render the effluent suitable for disposal have been suggested. These treatment plants usually are designed to replace the conventional septic system. Such treatment plants are generally too prohibitively expensive to be not economically feasible for treatment of residential sewage. Of these less common types of residential sewage treatment system for single dwelling units are those that operate on an aerobic bacterial process. In this type of system waste materials are broken down into carbon dioxide and water. In addition to the fact that the aerobic process is much more rapid than the anaerobic process, the products or the process are not objectionable with regard to odor or flammability.

Despite the advantages of aerobic sewage treatment systems, the majority of residences requiring their own sewage treatment still rely upon septic systems. In addition to the fact that a septic system may be less expensive initially to install, the apparent preference for septic systems may be based to some extent upon the necessity or providing proper operating conditions to support the bacteria growth necessary to provide an aerobic decomposition of waste materials. Although the maintenance of the necessary conditions to support aerobic bacterial activity may present no more than routine problems for a commercial or municipal sewage treatment plant, such systems must necessarily be relatively maintenance free and simple to operate in order to obtain acceptance on a wide scale basis for domestic, as opposed to commercial or municipal, use. Additionally, previous systems of this type have incorporated individual filter systems or small area filter systems which do not provide for adequate length of time between cleaning or take into consideration surge conditions that occur during normal operating conditions.

SUMMARY OF THE INVENTION

A primary object of the present invention is to provide a secondary sewage treatment system intended to operate in conjunction with a conventional septic system that enables the majority of the system to operate with aerobic bacterial activity. The system of this invention is designed to be interposed within a one or two compartment septic tank or within a septic system pump vault in liquid communication with the settling region of the tank or vault to provide a satisfactory effluent to a drain field. In particular, the present system is specially designed for use in residential septic tank treatment systems.

Generally speaking, the system of this invention biologically treats biodegradable wastes through aerobic microbial growth on media resulting in the biological oxidation of the waste products. Waste water from the septic tank settling zone is directed into an aerobic treatment vault providing an active aerobic region. The applied waste water settles from the active aerobic region, in which the media is contained, within the aerobic treatment vault to an underlying anoxic zone within the septic tank, and sludge settles to a still lower anaerobic zone within the septic tank. This invention uses media, which may be buoyant or fixed or packed media, located in a submerged treatment zone, and trickle media located in a non-submerged treatment zone. The media has a high surface area to volume ratio, a low resistance to liquid flow and a surface condition receptive to aerobic microbial growth.

A preferred system incorporates a relatively small aerobic treatment vault designed to be installed in a one or two compartment septic tank or in a septic system pump vault. The vault contains an aeration unit that aerates the waste water under turbulent flow conditions within the vault. As a consequence of the aeration unit's operation, waste water is circulated in contact with high surface area media within the submerged treatment zone resulting in the biological oxidation of the waste products. Waste water within the septic tank flows from the septic tank settling zone into the vault and is directed through the submerged media bed to the aeration unit where air is mixed with the waste water. The aerated waste water is discharged into the trickle zone within which trickle media is located. The waste water trickles through the trickle media and re-enters the submerged treatment zone where it is circulated through the submerged media. The waste water is continuously cycled within the vault from the submerged treatment zone, through the aeration unit, through the trickle zone and back to the submerged treatment zone.

The preferred system also provides for directing some of the waste water from the aeration unit back into the septic tank settling zone, thereby creating aerobic conditions in the upper regions of the settling zone where anaerobic conditions would otherwise exist. The preferred system also provides for directing some of the waste water from the aeration unit to the drain field. As treated water leaves the aerobic treatment vault, either back into the septic tank or to the drain field, additional waste water will circulate from the tank into the aerobic treatment vault.

The system provides an anoxic settling zone within the septic tank below the vault through which sludge may settle out for separate removal. A septic tank outlet may be provided in this settling zone for discharge of liquor effluent into the drain field. The treated liquor is collected through a drain conduit positioned in liquid communication with the aeration unit above the trickle zone in the aerobic treatment vault. The treated liquor then flows to the septic system drain field. The drain conduit from the vault may be the only discharge point from the treatment system or it may be auxiliary to a septic tank outlet.

BRIEF DESCRIPTION OF THE DRAWINGS

FIG. 1 is a vertical side elevation view, in cross section, of an exemplary embodiment illustrating the principals of operation of the system of this invention within a two compartment septic tank;

FIG. 2 is a detailed view of the aeration unit illustrated in FIG. 1;

FIG. 3 is a bottom plan view of the FIG. 2 aeration unit;

FIG. 4 is a detailed perspective view of the aeration unit illustrated in FIG. 1, showing its relationship with the return and discharge collection conduits;

FIG. 5 illustrates an alternative air discharge manifold arrangement; and

FIG. 6 is a graph illustrating the relationship between the pumping volume of the aeration unit and the height of the aeration unit above the waste water level within a septic tank.

DETAILED DESCRIPTION OF THE INVENTION

The on-site waste water treatment system as herein described is primarily intended for use in treating residential wastes. The typical effluent from residences consists primarily of human waste in admixture with biodegradable materials such as food and other materials associated with food preparation. The waste water to be treated generally contains gravity settlable solids. While any means of effecting solid-liquid separation may be used, the most commonly used method is a septic tank into which the waste water is discharged and the solids allowed to settle by gravity. The effluent leaving the septic tank, or other settling system such as a septic system pump vault, rather than being directed to a drain field or other point of discharge, is directed into an aerobic treatment vault.

The sewage treatment system of this invention comprisess a tank having an influent inlet to the interior of the tank located in the upper region of the tank, a treatment vessel disposed within the tank having an upper end in liquid communication with the tank interior above the tank inlet and a lower end in liquid communication with the tank interior below the tank inlet. A liquid aerating draft tube is disposed within the treatment vessel and has an upper end in liquid communication with the treatment vessel upper end and located above the tank inlet, and a lower end in liquid communication with the interior of the treatment vessel below the tank inlet. An air supply apparatus for supplying air into the draft tube is provided so that liquid within the draft tube will be both aerated and conducted upward through the draft tube and expelled from the draft tube into the treatment vessel upper end. Microbial growth-supporting media is contained within the treatment vessel so that at least a first portion of the media is located so as to be unsubmerged when the tank is filled to operating levels with liquid effluent, and so that at least a second portion of the media is located as to be submerged when the tank is filled to operating levels with liquid effluent, the media being so located that at least a portion of liquid expelled from the draft tube will trickle through the first media portion and so that the portion of liquid that trickled through the first media portion will flow through the second media portion and into the treatment vessel An effluent outlet in liquid communication with the treatment vessel is provided so that treated liquid effluent can be discharged from the system.

As shown in FIG. 1, the environment for the present invention by provided in a concrete tank 1, a conventional two-compartment septic tank being illustrated. The tank 1 has a lid 2, and left and right compartments 3 and 4. Waste influent inlet 5 is provided and a waste liquor outlet may be provided in the wall of the tank. A liquid transfer manifold 6 is provided between the two compartments to provide for liquid transfer between the two. With a two-compartment design, solids contained in the waste influent will settle out in the first compartment 3 and only liquid waste water will be transferred through manifold 6 into the second compartment 4. The relative elevations of the waste inlet 5 and the manifold 6 will determine the maximum and minimum liquid levels within the tank 1 as indicated in FIG. 1. An aerobic treatment vault 7 is provided in compartment 4. Vault 7 is extended into compartment 4 so that a substantial portion thereof will be submerged below the liquid level within tank 1. The vault may be supported from the roof 2 of compartment 4 and extends above the roof into an enclosure 7a mounted on the roof. The wall or shell of the vault may be provided as a cylindrical tube 7b having a nominal diameter of from 15 in. to 18 in. and fabricated from a length of PVC plastic on the order of 60 in. long. The bottom of the tube 7b is closed by an end cap 8 that is provided with a plurality of apertures having a suitable size, for example on the order of 1 in. diameter, so that the interior of the tube is in liquid communication with compartment 4 and so that microbial growth can pass from the tube's interior into compartment 4.

Within tube 7b, an air lift pump, consisting of a draft tube 9, a draft tube bell 10, an air supply line 11 and an air discharge manifold 12, is positioned by a support cross 13. Support 13 is a PVC coupling having intersecting vertical and horizontal tubes. The horizontal tubes act as support struts and are provided with extensions that contact the side wall of tube 7b to hold the elevation of the cross 13 at a desired location. Alternately, the horizontal tubes could be provided with sufficient length to extend across the diameter of tube 7b without extensions. The vertical tubes are provided in a size sufficient for draft tube 9 to be slidably contained therein by an appropriate clamp or a set screw fit so that the elevation of the draft tube 9 can be adjusted up or down as desired. The draft tube 9 is provided in a suitable length to extend from the top of tube 7b down about ⅔ into tube 7b; a length of about 40 in. being preferred. The draft tube bell 10 is located at the bottom of draft tube 9 to provide an enlarged opening into the draft tube and has a larger diameter bottom opening. Draft tube bell 10 is sealed to the bottom end of the draft tube so that the only access into the draft tube is through end cap 8. Air supply line 11 extends down through tube 7b and into the side of the draft tube bell. The inner end of supply line 11 is provided with an air discharge manifold 12 for introducing air into the bottom of draft tube 9. The air discharge manifold 12 may be located within the confines of the draft tube as shown in FIG. 2 or it may be located within draft tube bell 10 as shown in FIG. 5.

Air from an external supply, such as a ⅛ hp regenerative blower 15, is supplied through the air supply line 11 so as to provide a sufficient volume of pressurized air to create a turbulent upflow condition within the draft tube 9. Consequently, waste liquor entering the draft tube from within tube 7b will be aerated under turbulent flow conditions and also lifted upward to spill out of the top of the draft tube. FIG. 6 illustrates the variability in pumping volume that can be obtained by this air lift pump. Given a 36 in. long draft tube 9, having a nominal diameter of 4 in., coupled with a 4 in. high draft tube bell 10, for an effective overall length of 40 in., FIG. 6 illustrates the pumping volume in GPM available from a ⅛ hp regenerative blower when the height of the draft tube portion extended above the water line of tank 1 is varied between 20 and 30 in. By permitting the draft tube 9 to be adjusted lengthwise within the support cross 13, the height of the draft tube portion above the tank water line can be adjusted to affect the volume of waste liquor that is cycled up through the draft tube.

Other than in the space occupied by the support cross 13, the draft tube and draft tube bell, and the air supply line 11, the tube 7b is substantially completely filled with microbial growth-supporting media. As shown in FIG. 1, the portion of tube 7b that extends down from the tank water level is filled with a submerged media 20, such as 1½ in. plastic media spheres. By locating the support cross 13 so that is bottom edge is at the tank high water line, it becomes an easy matter to fill the tube 7b with submerged media spheres up to the tank high water line by pouring the media in through the open top of tube 7b. The submerged media 20 is preferably filled into tube 7b so that it is packed within the confines of tube 7b below of tank high water line. By providing the submerged media 20 as hollow plastic spheres, excessive microbial growth can slough off the media during operation of the system. The upper portion of the tube 7b, above the tank high water line, is substantially completely filled with a trickle media 22, such as multiple layers of foam plastic having an egg crate-like corrugated surface configuration, or such as the same media as used for the submerged media. Again, by locating the support cross 13 bottom edge at the tank high water line, the support cross 13 can serve as the bottom support of the trickle media 22 and insure that the trickle media remains in a non-submerged state during operation of the system.

With the system set up as shown in FIG. 1, on start-up supply air through supply line 11 will discharge into the bottom of draft tube 9, causing waste liquor within tank compartment 4 to be drawn initially into tube 7b through its apertured end cap 8. Waste liquor within tube 7b will be drawn into the draft tube and pumped upward under turbulent aerating conditions. The air—liquor interaction in the draft tube will saturate the liquor with oxygen. The aerated waste liquor will be discharged from the top of the draft tube and spill our onto the trickle media 22 within the trickle treatment zone 23 where it will trickle down through the trickle media layers and fall into the submerged media 20 within the submerged treatment zone 21. The waste liquor within the submerged treatment zone 21 will circulate gently through the zone and around the submerged media 20 and recycle back into the draft tube bell 10 and back up through the draft tube 9.

Until treated waste liquor is withdrawn from the system, only waste liquor within tube 7b will be cycled through the treatment vault 7. At the upper end of tube 7b, two discharge conduits are provided to remove treated waste liquor from the treatment vault 7. One conduit 30 extends from treatment vault 7 to tank compartment 3 so that aerated and treated waste liquor can be returned to tank 1. This return conduit 30 is provided with an inlet section that is located near the top of draft tube 9 as shown in FIGS. 1 and 4 so that some of the aerated and treated waste liquor that is erupted from draft tube 9 can enter conduit 30 and be returned to tank compartment 3. Another conduit 32 extends from treatment vault 7 to the septic tank drain field so that treated effluent can be discharged from the system. This effluent discharge conduit 32 is provided with an inlet section that is located near the top of draft tube 9 as shown in FIGS. 1 and 4 so that some of the aerated and treated waste liquor that is erupted from draft tube 9 can enter conduit 32 and be discharged as effluent from the system. By these means, treated waste liquor is removed from the air lift pump, thereby enabling additional waste liquor to enter from tank compartment 4 into the end cap 8 of tube 7b.

Recirculation of the aerated waste liquor to the inlet compartment 4 of tank 1 allows the upper region of compartment 4 to be maintained in an aerobic condition. The amount of aerobic waste liquor that is returned to compartment 3 can be altered: by appropriate selection of the size of conduit 30, by the placement of the inlet collection cup 32a of conduit 30 relative to the top end of draft tube 9 so that more or less of the collection cup 30a is exposed to the aerated waste liquor splashing out of the draft tube, by changing the shape of the collection cup to enable it to receive more or less liquor, or by shading the collection cup to reduce the volume of liquor collected. Likewise, the amount of treated effluent that is discharged to the septic tank drain field can be altered: by appropriate selection of the size of conduit 32, by the placement of the inlet collection cup 32a of conduit 32 relative to the top end of draft tube 9 so that more or less of the collection cup 32a is exposed to the aerated waste liquor splashing out of the draft tube, by changing the shape of the collection cup to enable it to receive more or less liquor, or by shading the collection cup to reduce the volume of liquor collected. Conduits 30, 32 preferably have a nominal diameter to 2 in. The enclosure 7a on top of tank roof 2 provides access to the top of the draft tube 9 and to the collection cups 30a, 32a for servicing, maintenance, and adjustment.

As treated waste liquor is either returned to compartment 3 or discharged to the drain field, make up waste liquor from compartment 4 enters the treatment vault 7. The treatment within treatment vault 7 is a combination of vertically-aligned stages of down flow trickle in trickle zone 23, mixing within treatment zone 21, and up flow in the aeration zone 25. Compartment 4, within which treatment vault 7 is located provides an anoxic settling zone below treatment vault 7 and an anaerobic sludge collection zone at the bottom of the tank. Septic tank liquor enters the treatment vault 7 from within compartment 4 through the bottom end cap 8, that serves as a submerged media retaining grate, and is drawn up through the submerged media 20 by the action of the air lift pump. The air lift pump discharge manifold 12, located below the liquid surface within the draft tube 9, introduces air into the draft tube bell 10. Aerated waste liquor then erupts out the top of the draft tube 9, where it splashes over the foam trickle media 22. This liquor then travels down through the foam media and mixes with the liquor in the submerged media 20 where it is drawn back into the pumping cycle of the air lift pump. A portion of the liquor which splashes over the top of the draft tube 9 is collected by conduits 30. 32. The volume of treated waste liquor that is recirculated to the tank inlet in compartment 3, and the volume of effluent discharged to the drain field, for a given conduit size and collection cup location and draft tube size, can be adjusted by adjusting: (a) the volume and pressure of the air delivered in air supply line 11; (b) the depth of the discharge of air through manifold 12 below the liquid level in tank 1; and (c) the height of the draft tube above the tank liquid level.

The air lift pumping effect is dependent on the height that the draft tube extends above the liquid level and the depth that the draft tube and air delivery manifold extend below the liquid level. As shown in Table I and FIG. 6, as the liquid level in tank 1 drops, the volume of the liquor collected in the recirculation and discharge collection lines decreases and, therefore, the volume of effluent discharged from the system also decreases. Therefore, the system self regulates the septic tank output. Since the pump rate of the system is comparatively slow, the septic tank acts as a surge tank. Using the data presented in FIG. 6 as an example, with the top of the draft tube 20.5 in. above the liquid level and the bottom of the bell 19.5 in. below the liquid level, the system discharges 0.375 gallons per minute, or 540 gallons per day. As the pump draws the liquid level in the tank down, the relative distances of the draft tube top and of the bell from the water level changes, and the output of the pump decreases. After the pump level has dropped 3.5 in. the output decreases to 0.296 GPM or 426 GPD, and when the pump level has dropped 8 in. the output will decrease to 0.016 GPM or 72 GPD. This phenomenon not only turns the septic tank into a surge tank, it also allows the tank to remain quiescent, reducing the possibility of tank short circuiting.

TABLE I

| Height of Draft Tube above the liquid level | Depth of Bottom of the Bell Below the liquid level | Volume Pumped | Time | GPM | GPD |
| --- | --- | --- | --- | --- | --- |
| 20.5 | 19.5 | 7.5 | 5 | 0.375 | 540 |
| 24 | 16 | 11 | 9.3 | 0.296 | 426 |
| 26.5 | 13.5 | 6.75 | 10 | 0.169 | 243 |
| 27.5 | 12.5 | 5 | 15 | 0.083 | 120 |
| 28.5 | 11.5 | 3 | 15 | 0.050 | 72 |
| 29.75 | 10.25 | 1.5 | 23 | 0.016 | 23 |

The air lift pump provides an air diffusing process by which air is ejected into the treatment vault 7 without disturbing the surrounding media mixing zone 21. During operation of the system, influent entering the tank 1 is circulated through the submerged media 20 by the pumping action of the air lift pump. As air is discharged into the draft tube 9, it aerates the liquor within the draft tube as it rises. The waste liquor is churned and pumped along with the rising air up and out of the draft tube. As waste influent enters the system, the liquor flows gently down through the media mixing zone 21, passing through the media 20 (i.e. around the individual spheres that make up the media). From the bottom of the mixing zone 21, the liquor passes vertically through the separate passageway, provided by the draft tube 9. The air forced into the draft tube induces a pumping action while aerating the liquor passing upward in the draft tube. Unlike the gentle flow in the mixing zone 21, the flow within the vertical passageway of draft tube 9 is relatively turbulent. The volume of air used and the proximity of the vertical flow passageway to mixing zone 21 is such that the liquor is continuously circulated in a flow path, including the mixing zone 21 and the vertical flow passageway within the draft tube, at a flow rate and under conditions suitable for promoting thorough mixing of the liquor with the media, and suitable for maintaining aerobic microbial growth on the media. If the flow rate of the liquor through the mixing zone 21 is too turbulent, microbial growth will be washed off the media. On the other hand, if the flow rate through the media is too slow, excessive microbial growth will accumulate and may cause clogging. When the flow rate is correct, excessive microbial growth falls off the media and is naturally recycled. Dead growth will fall from the media and settle through the settling zone in compartment 4 of tank 1, forming sludge in the sludge-collecting zone. Periodically the sludge may be pumped out and discarded or recycled.

The operation of the treatment vault 7 reduces the Biochemical Oxygen Demand ($BOD_5$), Total Suspended Solids (TSS) and Oil and Grease (O&G) content of the septic effluent from that of a typical septic tank without the treatment vault 7. For example, in a system handling 243 GPD, from a family of six, with both parents working, and an undersized septic tank (850 gallons) where the septic tank was in need of pumping during the time of data collection, the $BOD_5$, TSS and O&G into the treatment vault 7 averaged 344, 535 and 140 mg/l respectively. The system effluent values from the treatment vault 7 were 30, 13 and 9 mg/l, respectively, representing a 91%, 98% and 93% reduction, respectively.

While the preferred embodiments of the invention have been described herein, variations in the design may be made. For example, various feature of the two embodiments described herein may be substituted for one another or combined, as appropriate. As another example, the secondary treatment system apparatus of this invention might be incorporated into a combination treatment tank that would have a first section that would function as a conventional septic tank and a second section that would function in accordance with the principles described herein. The scope of the invention, therefore, is only to be limited by the claims appended hereto.

The embodiments of the invention in which an exclusive property is claimed are defined as follows:

I claim:

1. A sewage treatment system which comprises a tank having an influent inlet to the interior of the tank located in the upper region of said tank;

treatment vessel means disposed within said tank having an upper end portion extending above the tank inlet and a lower end portion disposed within the tank interior below said tank inlet; a first microbial growth-supporting media contained within said treatment vessel lower end portion; and a second microbial growth-supporting media contained within said treatment vessel upper end portion, the second media being located above the first media; said treatment vessel means and said first and second media being constructed and arranged so that, when said tank is filled to operating levels with liquid effluent, said first media is substantially submerged and said second media is unsubmerged;

liquid aerating means comprising a draft tube disposed within said treatment vessel and air supply apparatus; said draft tube extending through said second media and into said first media and having an upper end adjacent the treatment vessel upper end above said tank inlet and above said second media and a lower end below said tank inlet, said draft tube having a liquid effluent inlet located within said first media in liquid communication with the interior of said treatment vessel below said tank inlet; said air supply apparatus being connected to said treatment vessel to supply air to said draft tube; said aerating means supplying air into said draft tube so that liquid within said draft tube will be both aerated and conducted upward through said draft tube and expelled from said draft tube into the treatment vessel upper end portion so that at least a first portion of liquid expelled from said draft tube will trickle through said second media and so that the first portion of liquid that trickled through said second media will flow through said first media, and so that liquid within said treatment vessel will be circulated through said first media and mixed with the first portion of liquid and then conducted through the draft tube liquid inlet into said draft tube; and effluent outlet means in said treatment vessel upper end portion for collecting a second portion of liquid expelled from said draft tube so that said second portion can be collected at an elevation above said tank inlet and discharged from said system.

2. The system of claim 1 wherein said air supply apparatus comprises an air delivery tube extended into said treatment vessel means and into said draft tube so as to terminate adjacent the bottom end of said draft tube.

3. The system of claim 1 wherein said effluent outlet means comprises a conduit having an inlet located adjacent to said draft tube upper end so that said second portion of liquid expelled from said draft tube will be collected by the conduit inlet and conducted through said conduit.

4. The system of claim 1 including an effluent return conduit having an inlet located adjacent to said draft tube upper end so that a portion of liquid expelled from said draft tube will be collected by the conduit inlet and returned to said tank interior externally of said treatment vessel means.

5. The system of claim 1 wherein said air supply apparatus comprises an air delivery tube extended into said treatment vessel and into said draft tube so as to terminate adjacent the bottom end of said draft tube; said effluent outlet means comprises an effluent conduit having an inlet located adjacent to said draft tube upper end so that said second portion of liquid expelled from said draft tube will be collected by the effluent conduit inlet and conducted out of the system through said effluent conduit; and including an effluent return conduit having an inlet located adjacent to said draft tube upper end so that a third portion of liquid expelled from said draft tube will be collected by the return conduit inlet and returned to said tank interior externally of said treatment vessel means.

6. The system of claim 5 wherein said draft tube is adjustably mounted within said treatment vessel means so that the height of the draft tube upper end and the height of said draft tube lower end may be vertically adjusted relative to the elevation of said tank inlet.

7. The system of claim 1 wherein said draft tube is adjustably mounted within said treatment vessel means so that the height of the draft tube upper end and the height of said draft tube lower end may be vertically adjusted relative to the elevation of said tank inlet.

8. The system of claim 1 wherein said first media is provided as buoyant elements; and wherein said draft tube is provided with positioning means that locates said draft tube within said treatment vessel means and supports said second media so that said first and second media are physically separated from one another.

9. A sewage treatment system which comprises treatment vessel means constructed so as to be positionable within an effluent tank having an effluent inlet, said treatment vessel means having an upper end portion locatable above the tank inlet and a lower end portion locatable within the tank interior below said tank inlet; a first microbial growth-supporting media contained within a bottom portion of said treatment vessel; and a second microbial growth-supporting media contained within a top portion of said treatment vessel, the second media being located above the first media; said treatment vessel means and said first and second media being constructed and arranged so that, when installed in an effluent tank that is filled to operating levels with liquid effluent, said first media is substantially submerged and said second media is unsubmerged;

liquid aerating means comprising a draft tube disposed within said treatment vessel and air supply apparatus; said draft tube extending through said second media and into said first media and having an upper end adjacent the treatment vessel upper end portion and above said second media and a lower end above the treatment vessel lower end, said draft tube having a liquid effluent inlet located within said first media in liquid communication with the interior of said treatment vessel; said air supply apparatus being connected to said treatment vessel to supply air to said draft tube; said aerating means providing an air supply to said draft tube so that liquid within said draft tube will be both aerated and conducted upward through said draft tube and expelled from said draft tube into the treatment vessel upper end portion so that, when said treatment vessel is installed in an effluent tank that is filled to operating levels with liquid effluent, at least a first portion of liquid expelled from said draft tube will trickle through said second media and so that the first portion of liquid that trickled through said second media will flow through said first media, and so that liquid within said treatment vessel will be circulated through said first media and mixed with the first portion of liquid and then conducted through the draft tube liquid inlet into said draft tube; and effluent outlet means in said treatment vessel upper end portion for collecting a second portion of liquid expelled from said draft tube so that said second portion can be collected at an elevation above an effluent tank inlet and discharged from said system when said treatment vessel means is installed in an effluent tank that is filled to operating levels with liquid effluent.

10. The system of claim 9 wherein said air supply apparatus comprises an air delivery tube extended into said treatment vessel means and into said draft tube so as to terminate adjacent the bottom end of said draft tube.

11. The system of claim 9 wherein said effluent outlet comprises a conduit having an inlet located adjacent to said draft tube upper end so that said second portion of liquid expelled from said draft tube will be collected by the conduit inlet and conducted through said conduit.

12. The system of claim 9 wherein said air supply apparatus comprises an air delivery tube extended into said treatment vessel and into said draft tube so as to terminate adjacent the bottom end of said draft tube; said effluent outlet comprises an effluent conduit having an inlet located adjacent to said draft tube upper end so that said second portion of liquid expelled from said draft tube will be collected by the effluent conduit inlet and conducted out of the system through said effluent conduit.

13. The system of claim 12 wherein said draft tube is adjustably mounted within said treatment vessel means so that the height of the draft tube upper end and the height of said draft tube lower end may be vertically adjusted relative to the elevation of an effluent tank inlet.

14. The system of claim 9 wherein said draft tube is adjustably mounted within said treatment vessel means so that the height of the draft tube upper end and the height of said draft tube lower end may be vertically adjusted relative to the elevation of an effluent tank inlet.

15. The system of claim 9 wherein said first media is provided as buoyant elements; and wherein said draft tube is provided with positioning means that locates said draft tube within said treatment vessel means and supports said second media so that said first and second media are physically separated from one another.

16. A sewage treatment system which comprises a pre-installed buried septic tank having an influent inlet to the interior of the septic tank located in the upper region of said septic tank and an access opening to said septic tank interior;

retro-fit treatment vessel means installed within said septic tank after said septic tank has been buried, said treatment vessel means being installed through the septic tank access opening and having an upper end portion extending above the septic tank inlet and through said septic tank access opening and a lower end portion disposed within the septic tank interior below said septic tank inlet; a first microbial growth-supporting media contained within said treatment vessel lower end portion; and a second microbial growth-supporting media contained within said treatment vessel upper end portion, the second media being located above the first media; said treatment vessel means and said first and second media being constructed and arranged so that, when said septic tank is filled to operating levels with liquid effluent, said first media is substantially submerged and said second media is unsubmerged;

liquid aerating means comprising a draft tube disposed within said treatment vessel and air supply apparatus; said draft tube extending through said second media and into said first media and having an upper end adjacent the treatment vessel upper end above said septic tank inlet and above said second media and a lower end below said septic tank inlet, said draft tube having a liquid effluent inlet located within said first media in liquid communication with the interior of said treatment vessel below said septic tank inlet; said air supply apparatus being connected to said treatment vessel to supply air to said draft tube; said aerating means supplying air into said draft tube so that liquid within said draft tube will be both aerated and conducted upward through said draft tube and expelled from said draft tube into the treatment vessel upper end portion so that at least a first portion of liquid expelled from said draft tube will trickle through said second media and so that the first portion of liquid that trickled through said second media will flow through said first media, and so that liquid within said treatment vessel will be circulated through said first media and mixed with the first portion of liquid and then conducted through the draft tube liquid inlet into said draft tube; and effluent outlet means in said treatment vessel upper end portion for collecting a second portion of liquid expelled from said draft tube so that said second portion can be collected at an elevation above said septic tank inlet and discharged from said system.

17. The system of claim 16 wherein said air supply apparatus comprises an air delivery tube extended into said treatment vessel means and into said draft tube so as to terminate adjacent the bottom end of said draft tube.

18. The system of claim 16 wherein said effluent outlet means comprises a conduit having an inlet located adjacent to said draft tube upper end so that said second portion of liquid expelled from said draft tube will be collected by the conduit inlet and conducted through said conduit.

19. The system of claim 16 including an effluent return conduit having an inlet located adjacent to said draft tube upper end so that a portion of liquid expelled from said draft tube will be collected by the conduit inlet and returned to said septic tank interior externally of said treatment vessel means.

20. The system of claim 16 wherein said air supply apparatus comprises an air delivery tube extended into said treatment vessel and into said draft tube so as to terminate adjacent the bottom end of said draft tube; said effluent outlet means comprises an effluent conduit having an inlet located adjacent to said draft tube upper end so that said second portion of liquid expelled from said draft tube will be collected by the effluent conduit inlet and conducted out of the system through said effluent conduit; and including an effluent return conduit having an inlet located adjacent to said draft tube upper end so that a third portion of liquid expelled from said draft tube will be collected by the return conduit inlet and returned to said septic tank interior externally of said treatment vessel means.

21. The system of claim 20 wherein said draft tube is adjustably mounted within said treatment vessel means so that the height of the draft tube upper end and the height of said draft tube lower end may be vertically adjusted relative to the elevation of said septic tank inlet.

22. The system of claim 16 wherein said draft tube is adjustably mounted within said treatment vessel means so that the height of the draft tube upper end and the height of said draft tube lower end may be vertically adjusted relative to the elevation of said septic tank inlet.

* * * * *